United States Patent
Davis et al.

(10) Patent No.: US 11,244,146 B2
(45) Date of Patent: Feb. 8, 2022

(54) SYSTEMS AND METHODS FOR SECURE USER LOGINS WITH FACIAL RECOGNITION AND BLOCKCHAIN

(71) Applicant: JPMORGAN CHASE BANK, N.A., New York, NY (US)

(72) Inventors: Jerry Davis, Bournemouth (GB); Shravan Kumar Parunandula, Andhra Pradesh (IN); Pranav Vishwas Deshpande, Maharashtra (IN); Krishna Kumar Ramadas, Bournemouth (GB); Uche Ojukwu, London (GB); Frank Van Hoof, Ringwood (GB)

(73) Assignee: JPMorgan Chase Bank, N.A., New York, NY (US)

(*) Notice: Subject to any disclaimer, the term of this patent is extended or adjusted under 35 U.S.C. 154(b) by 60 days.

(21) Appl. No.: 16/807,940

(22) Filed: Mar. 3, 2020

(65) Prior Publication Data

US 2020/0285836 A1    Sep. 10, 2020

Related U.S. Application Data

(60) Provisional application No. 62/814,131, filed on Mar. 5, 2019.

(51) Int. Cl.
*G06K 9/00* (2006.01)
*H04L 29/06* (2006.01)
*G06K 9/62* (2006.01)
*G06F 9/54* (2006.01)
(Continued)

(52) U.S. Cl.
CPC ......... *G06K 9/00275* (2013.01); *G06F 9/542* (2013.01); *G06K 9/00302* (2013.01); *G06K 9/6215* (2013.01); *G06N 20/10* (2019.01); *H04L 9/3236* (2013.01); *H04L 63/0815* (2013.01);
(Continued)

(58) Field of Classification Search
CPC .......... G06K 9/00275; G06K 9/00302; G06K 9/00926; G06K 9/00288; G06K 9/6215; G06K 9/6232; G06K 9/6269; G06K 9/4628; G06N 20/10; G06N 5/003; G06N 7/005; G06N 20/20; G06N 3/0454; G06N 3/08; G06F 21/32; G06F 21/64; G06F 9/542; H04L 9/3231; H04L 9/3239; H04L 63/0861; H04L 63/0815; H04L 9/3236; H04L 2209/38
See application file for complete search history.

(56) References Cited

U.S. PATENT DOCUMENTS 10,360,464 B1 *   7/2019  McKay ............... H04L 63/0861
2013/0250108 A1 * 9/2013  Du .................... G06K 9/00221
                                                      348/148
(Continued)

*Primary Examiner* — Nimesh Patel
(74) *Attorney, Agent, or Firm* — Hunton Andrews Kurth LLP

(57) ABSTRACT

Embodiments disclosed herein provide for systems and methods for secure logins using facial recognition with a blockchain-based verification system. The systems and methods provide for authentication, authorization, and secure storage of biometrics data. Authentication is performed with a machine learning system implementing the facial recognition. The biometrics data can be securely stored on a blockchain and used to perform the facial recognition during login. Authorization is provided with an active directory system.

18 Claims, 8 Drawing Sheets

(51) Int. Cl.
*H04L 9/32* (2006.01)
*G06N 20/10* (2019.01)

(52) U.S. Cl.
CPC ...... *H04L 63/0861* (2013.01); *H04L 2209/38* (2013.01)

(56) References Cited

U.S. PATENT DOCUMENTS

| | | | | |
|---|---|---|---|---|
| 2015/0092996 | A1* | 4/2015 | Tian | G06K 9/00926 382/118 |
| 2015/0106897 | A1* | 4/2015 | Davis | G06F 21/32 726/7 |
| 2015/0234454 | A1* | 8/2015 | Kurz | G06T 19/006 345/156 |
| 2016/0335483 | A1* | 11/2016 | Pfursich | G06K 9/00899 |
| 2017/0118209 | A1* | 4/2017 | Saravanan | G06Q 50/265 |
| 2018/0048461 | A1* | 2/2018 | Jutla | H04L 9/3236 |
| 2019/0180311 | A1* | 6/2019 | Chan | G06Q 30/0236 |
| 2020/0019760 | A1* | 1/2020 | Ma | G06K 9/00221 |

\* cited by examiner

System 40

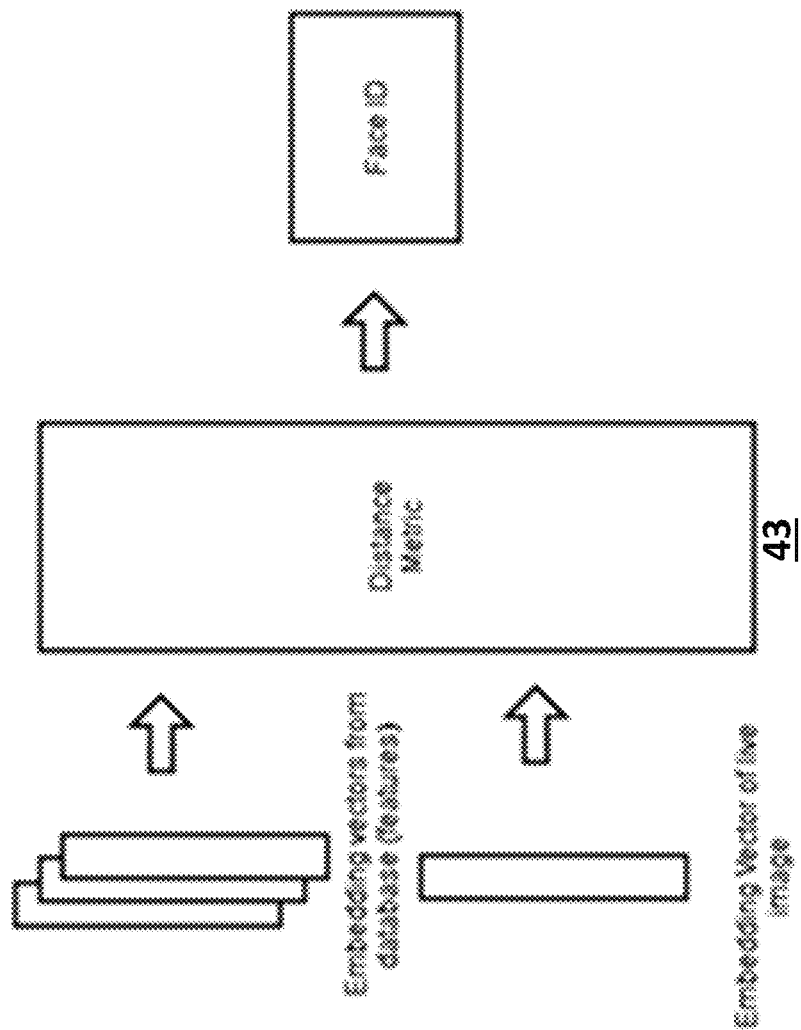

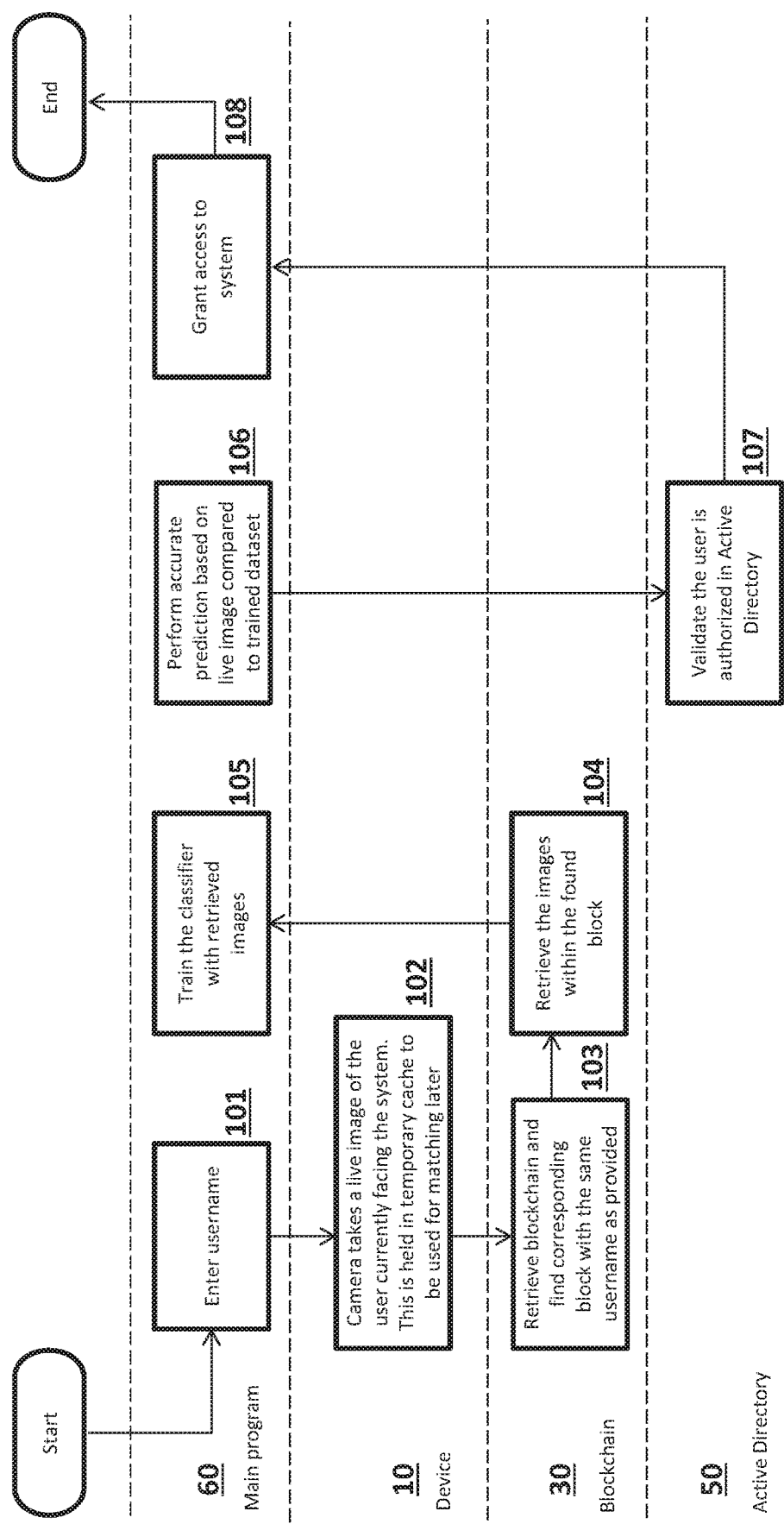

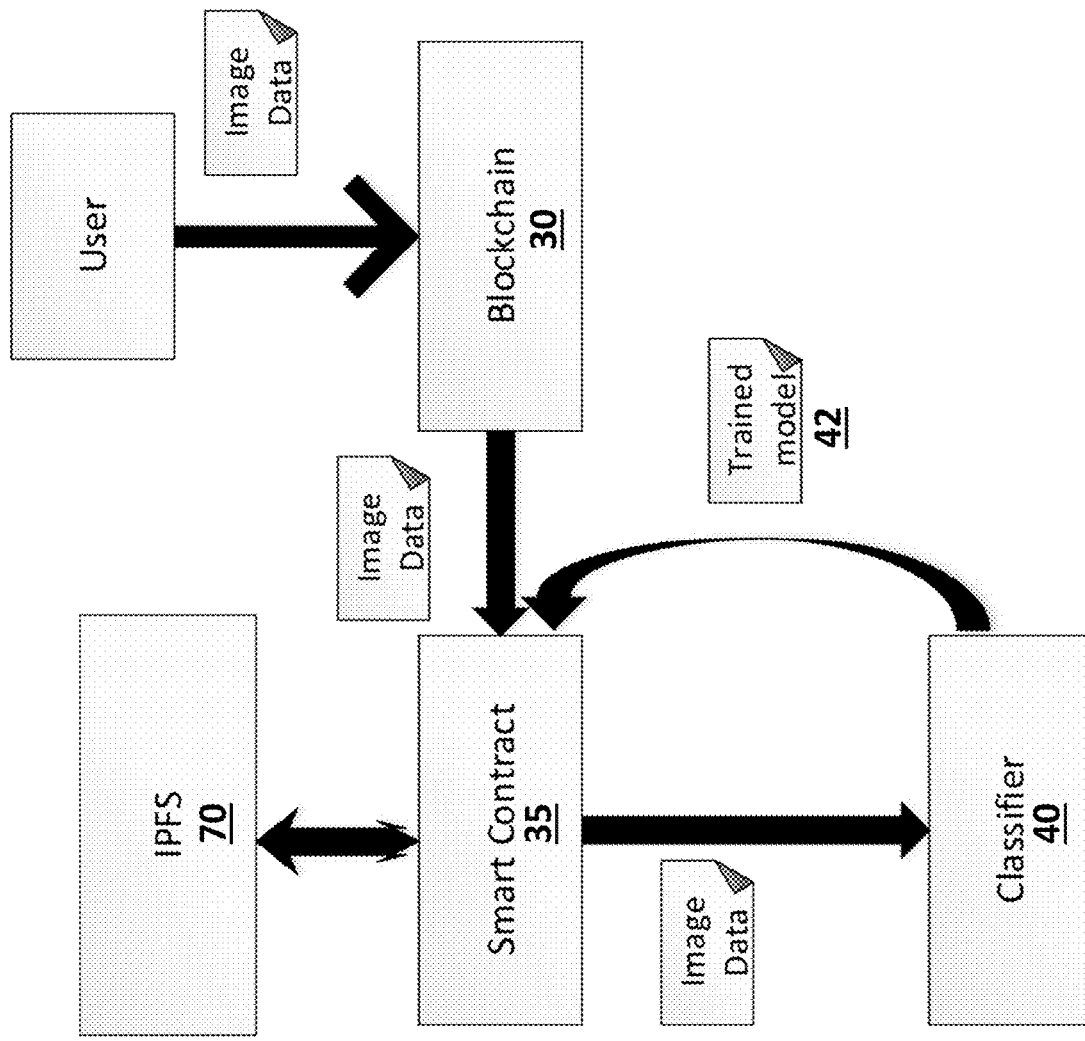

SYSTEMS AND METHODS FOR SECURE USER LOGINS WITH FACIAL RECOGNITION AND BLOCKCHAIN

CROSS-REFERENCE TO RELATED APPLICATION

This application claims the benefit of the filing date of, and incorporates by reference thereto in its entirety, U.S. Provisional Patent Application Ser. No. 62/814,131, filed on Mar. 5, 2019.

FIELD OF THE INVENTION

The present invention relates generally to facial recognition, and more particularly to a system and method for secure logins using facial recognition with a blockchain-based verification system.

BACKGROUND

Today, company employees spend many hours typing in passwords in order to log in to company systems. In many cases, information technology (IT) support staff is required to assist those who have forgotten or have simply run into problems with their passwords, resulting in additional lost time and decreased efficiency. Currently, there are a few login systems utilizing facial recognition technology. However, many of these systems are largely insecure. For example, many facial recognition technologies utilize biometric data (e.g., facial image data) that is stored on the systems' general storage location with no additional levels of security.

Accordingly, there is a need for a secure login system employing facial recognition technology. There is also a need to ensure that the set of images being used for the facial recognition are trustworthy and free from tampering.

SUMMARY

According to one embodiment, the invention relates to a computer-implemented system and method for secure logins using facial recognition with a blockchain-based verification system. The systems and methods provide for authentication, authorization, and secure storage of biometrics data. Authentication may be performed with a machine learning system implementing the facial recognition. The biometrics data can be securely stored on a cryptography-enabled blockchain and used to perform the facial recognition during login. Further, authorization may be provided with an active directory system. The systems and methods herein can eliminate the frequent use of passwords.

According to an embodiment, a method for secure login to a device can include: receiving, with a processor, a username from a user; capturing, with a camera, a live image of the user; storing, with the processor, the live image at a memory cache; retrieving, with a blockchain application program interface (API), a block in a blockchain corresponding to the username; extracting, with the blockchain API, at least one of a machine learning classifier model and a plurality of facial images from the retrieved block; determining, with at least one of the machine learning classifier model and the plurality of facial images, whether the live image matches the plurality of facial images; and selectively providing access to the device based on the determination.

According to another embodiment, a method for secure login to a device can also include: receiving, with a processor, a username from a user; capturing, with a camera, a live image of the user; storing, with the processor, the live image at a memory cache; retrieving, with a blockchain API, a hash stored in smart contract associated with the blockchain API, wherein the hash specifies the location of a machine learning classifier model stored in an interplanetary file system (IPFS) database; extracting, with the smart contract, at least one of the machine learning classifier model and the plurality of facial images from the IPFS database; determining, with at least one of the machine learning classifier model and the plurality of facial images, whether the live image matches the plurality of facial images; and selectively providing access to the device based on the determination.

Further, according to an embodiment, a system for secure login to a device can include: a processor; a camera; a blockchain; and a blockchain API; wherein: (a) the processor is configured to receive a username from a user; (b) the camera is configured to capture a live image of the user; (c) the blockchain API is configured to (i) retrieve a block in a blockchain corresponding to the username and (ii) extract at least one of a machine learning classifier model and a plurality of facial images from the retrieved block; and (d) the processor is further configured to (i) determine, with at least one of the machine learning classifier model and the plurality of facial images, whether the live image matches the plurality of facial images and (ii) selectively provide access to the device based on the determination.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2F illustrates an example embodiment of the classifier in the facial recognition classifier system in FIG. 2E.

FIG. 3 illustrates another process flow for authentication and authorization of a registered user according to an embodiment of the present invention.

FIG. 4 illustrates a registration, authentication, and authorization system of a registered user according to an embodiment of the present invention.

DETAILED DESCRIPTION

Figure 1:
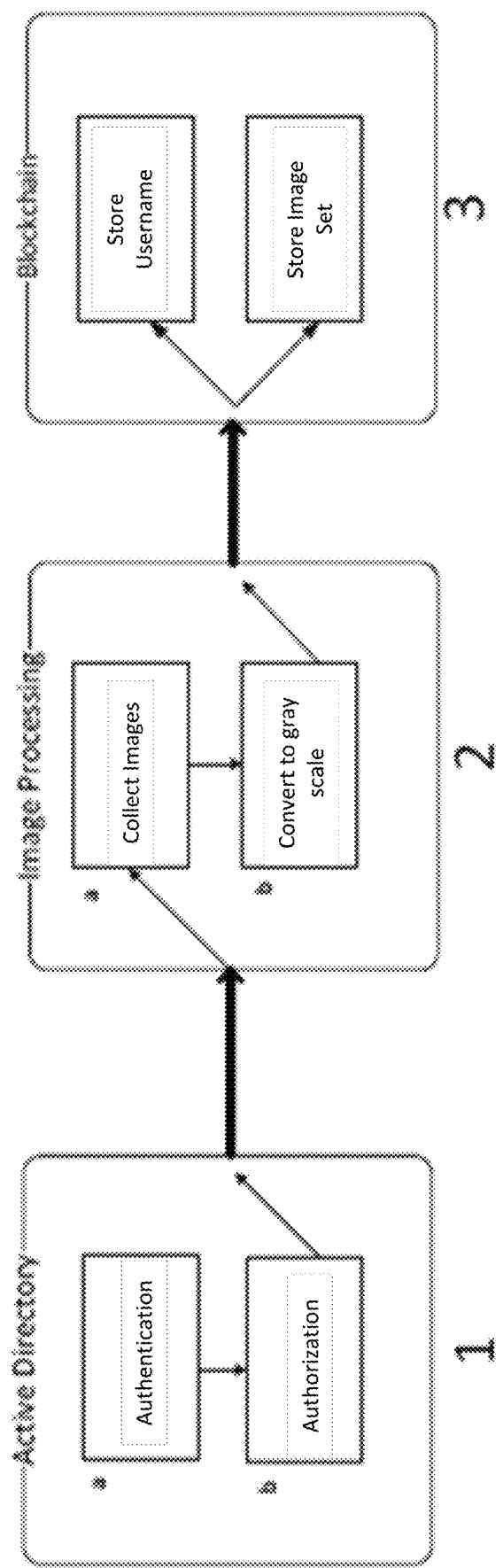
FIG. 1 illustrates the steps taken by an individual user in order to register their biometric face data.

Exemplary embodiments of the invention will now be described in order to illustrate various features of the invention. The embodiments described herein are not intended to be limiting as to the scope of the invention, but rather are intended to provide examples of the components, use, and operation of the invention.

FIG. 1 illustrates the steps taken by an individual user in order to register their biometric face data. For example, the registration process may be utilized by company employees at their respective computing devices. According to an embodiment, the computing devices may include at least one programmed processor, at least one memory or storage device, at least one display, and at least one connected camera. Further, as depicted in the figure, at step 1a, a user provides their credentials, e.g., username and password, to an active directory system via their respective computing device. According to an embodiment, the active directory system may be a back-end server including a plurality of processes and services that authenticate and authorize users intending to register their face data as well as gain access to a certain system or perform a certain transaction. According to an embodiment, the active directory system may authenticate the provided credentials by comparing the provided username and password to a list of accepted usernames and passwords. If the active directory system confirms that the provided username and password matches one of the accepted usernames and passwords in the list, the active directory system may then authorize the user to register their face data as depicted in step 1b. According to an embodiment, authorization can be achieved by leveraging a protocol such as Kerberos protocol transition and constrained delegation. Therefore, if the authentication in step 1a is successful, the active directory system will return a Kerberos service ticket for the user, which can be used to access back-end services. The computing device may then activate (e.g., turn on) the at least one connected camera as depicted in step 2a. In addition, the computing device may also activate any corresponding image processing software associated with the camera. Then, once the user is directly facing the camera, a series of images are taken in quick succession. According to an embodiment, the number of images taken is a configurable parameter. For example, thirty or more consecutive images can be taken.

Then, at step 2b, the set of images generated in step 2a is processed by the image processing software and converted to gray scale, thereby allowing the features from the face to be more easily extracted. For example, the image is first cropped so that only the face remains, thereby reducing the size, footprint and noise. Then, the image is converted to gray scale to allow the extraction of hidden features from the image. According to an embodiment, the images may then be provided to a machine-learning, facial recognition classifier system for training. For example, the images may be provided to a deep neural network model that directly learns a mapping from face images to a compact Euclidean space where distances directly correspond to a measure of face similarity. According to an embodiment, the work flow for the facial recognition classifier system can include the detection of faces using pre-trained models and the pre-processing of the images. The classifier sits on top of the pre-trained model, which is the core dataset, comprised of a plurality of open source images. Further, the classifier could be achieved with one-class support vector machines (SVMs), random forests, etc. For example, the SVM can train the classifier against the user data each time the users try to access the system. SVMs are supervised learning models that analyze data used for classification and regression analysis. Given a set of training examples, with each marked as belonging to one or the other of two categories, an SVM training algorithm builds a model that assigns new examples to one category or the other. The algorithm implementation can be performed by using a machine learning framework, e.g., scikit-learn. Further, because the training can be performed for one user at a time, the training is performed very quickly. The pre-processing can include (i) pose estimation of the facial images, (ii) affine transformation of the facial images, (iii) the extraction of 128-dimensional embedding vectors of the transformed facial images using a deep neural network, e.g., the feature set, (iv) training the classifier on the feature set, and (v) inferring on new data using the trained model. According to an embodiment, the specific task of determining the pose of an object in an image is referred to as pose estimation. Further, affine transformation corresponds to a linear mapping method that preserves points, straight lines, and planes. Sets of parallel lines remain parallel after an affine transformation. The affine transformation technique is typically used to correct for geometric distortions or deformations that occur with non-ideal camera angles. In the context of facial recognition, head pose estimation and affine transformation can be used for facial alignment. According to an embodiment, the neural network computes the 128-dimensional embedding vectors for each face and then tweaks the weights of the network using a triplet loss function. Further, during the training, the 128-dimensional embedding vectors of the anchor and positive images are pushed closer together while, at the same time, the embedding vectors of the anchor and the negative images are pushed further away from each other. In this manner, the network is able to learn to quantify faces and return highly robust and discriminating embedding vectors suitable for facial recognition. As such, the deep neural network can represent (or embed) the face on a 128-dimensional unit hyper-sphere. According to an embodiment, a large distance between two face embedding vectors indicates that the faces are likely not of the same person. In other words, with the embedding vectors, techniques such as clustering, similarity decisions, and classifications can be made easier as compared to other facial recognition techniques, in which the Euclidean distance between features is not meaningful.

The computing device may then activate a blockchain representational State Transfer (REST) API in order to store the processed facial image data and corresponding machine learning classifier model in a blockchain. In particular, at step 3, a blockchain transaction may be created with (a) the username provided by the user, (b) the set of processed images, and (c) the machine learning classifier model associated with the processed images. According to an embodiment, a blockchain is a distributed ledger system that comprises a plurality of nodes, where each node comprises one or more computer servers providing processing power and data storage. Distributed ledgers such as blockchains provide cryptographically-verified ledgers where trust is not provided by a central authority or trusted intermediary, but is instead established by the dissemination of identical copies of the same ledger with cryptographic proof of its correctness to each of the nodes. Each event within a predefined set of events may be a "transaction" for which the data may be written as a new block, or part of a new block, on the chain. Each transaction creates a permanent record and allows each part of the transaction chain to be linked together. The blockchain may comprise a public, private, permissioned, or consortium-type blockchain, for example. According to one embodiment, the blockchain comprises a permissioned blockchain operated by a single entity (e.g., a company), which operates each node on the blockchain, wherein each node comprises computer servers providing processing power, software, and data storage. Further, according to an embodiment, the new block including the processed images may be cryptographically signed and mined, i.e., validated, by other nodes. According to an embodiment, different types of blockchains can be utilized as long as it has the ability to receive, store, and retrieve images. For example, a geth client blockchain can be used, e.g., Quorum/ethereum. Further, if a set of images becomes old, a new set of images and, therefore, an updated machine learning classifier model can be inserted on top of the chain, e.g., through re-registration. The blockchain can also be configured to directly hash the images onto the chain or hash a reference of the images onto the chain, where they can be encrypted and stored on a secure database for later retrieval. For example, the images can be stored in an IPFS database, which is highly distributed and decentralized. In this regard, the IPFS hashes associated with the relevant images and/or models can be stored on the blockchain. According to an embodiment, the IPFS hash specifies the location of the file stored in the IPFS network.

Figure 2A:
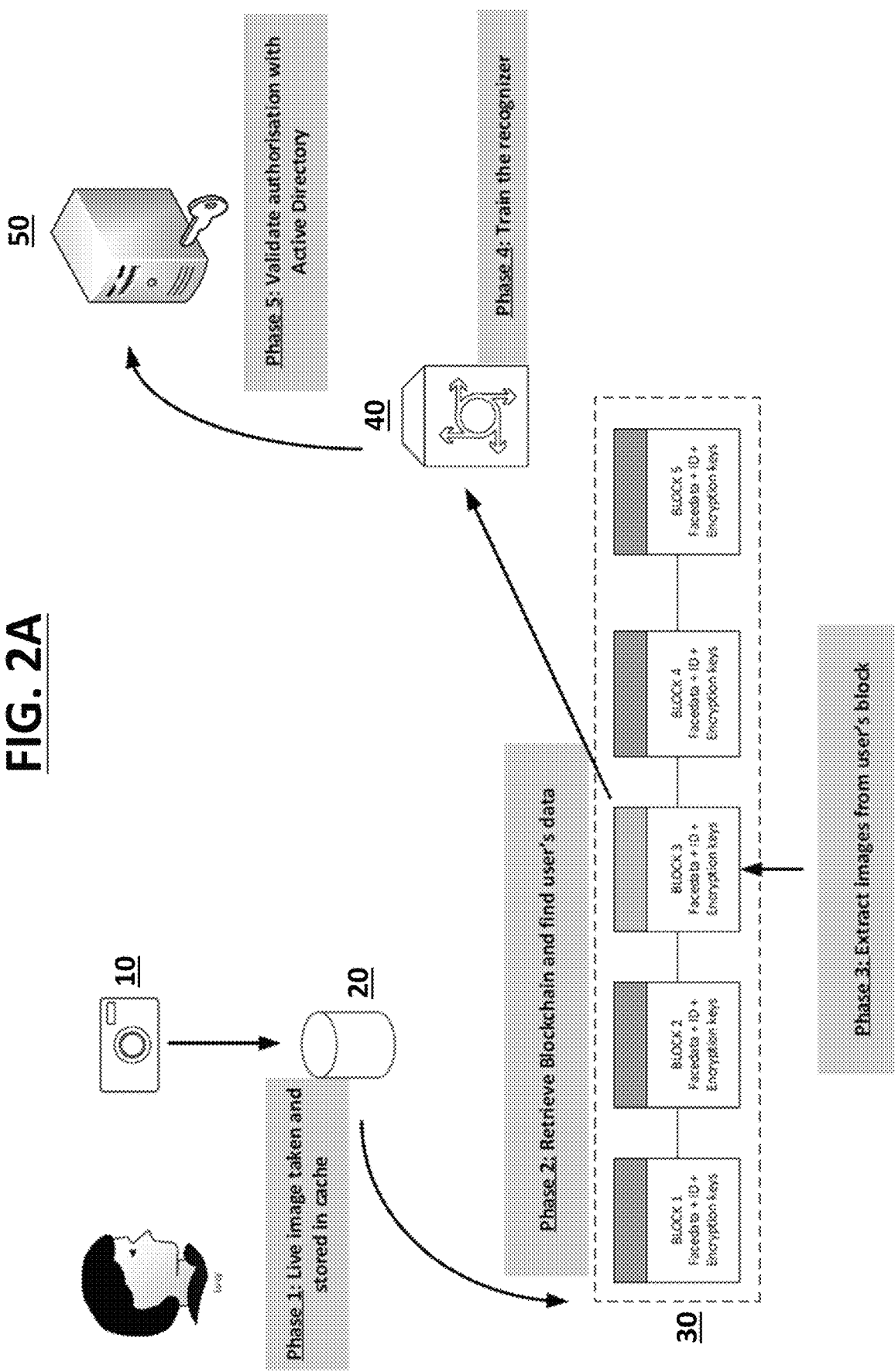
FIG. 2A illustrates an overview of the authentication and authorization process for a registered user according to an embodiment of the present invention.

FIG. 2A illustrates an overview of the authentication and authorization process for a registered user according to an embodiment of the present invention. As described above, authentication generally refers to the process of verifying the identity of the user, while authorization refers to verifying that the user is authorized to access a certain system or perform a certain transaction. According to an embodiment, after the plurality of images and corresponding machine learning classifier model are successfully registered with a username in a blockchain, the user may be authenticated and authorized to access a proprietary company system based on facial recognition. For example, in order to access a particular company system, a user may first input their username into their personal computing device. Shortly after, a connected camera 10 (as well as corresponding image processing software) may be activated by the computing device in order to capture a live image of the user as depicted in phase 1. In another embodiment, the camera 10 can be distinct from the computer device and/or corresponding image processing software, e.g., camera associated with a mobile device. After the image is taken, the computing device may then store the captured image in a cache 20 (e.g., memory or storage device) as depicted in phase 1. Then, at phase 2, the computing device activates the blockchain API in order to retrieve a blockchain 30 including the user's previously-stored biometric data (e.g., facial images) and/or machine learning classifier model. For example, as depicted in the figure, the blockchain 30 may include a plurality of blocks, each block containing username and corresponding image data and/or machine learning classifier model for a particular user. According to an embodiment, the user's biometric data and/or machine learning classifier model may be found based on the username provided by the user. In particular, the blockchain API determines which of the blockchain 30 blocks includes a username matching the username provided by the user. After a match is determined, the previously-stored biometric data and/or machine learning classifier model is extracted from the block at phase 3. For example, as depicted in the figure, the particular user's image data and/or machine learning classifier model may be extracted from block 3 of the blockchain 30.

Figure 2B:
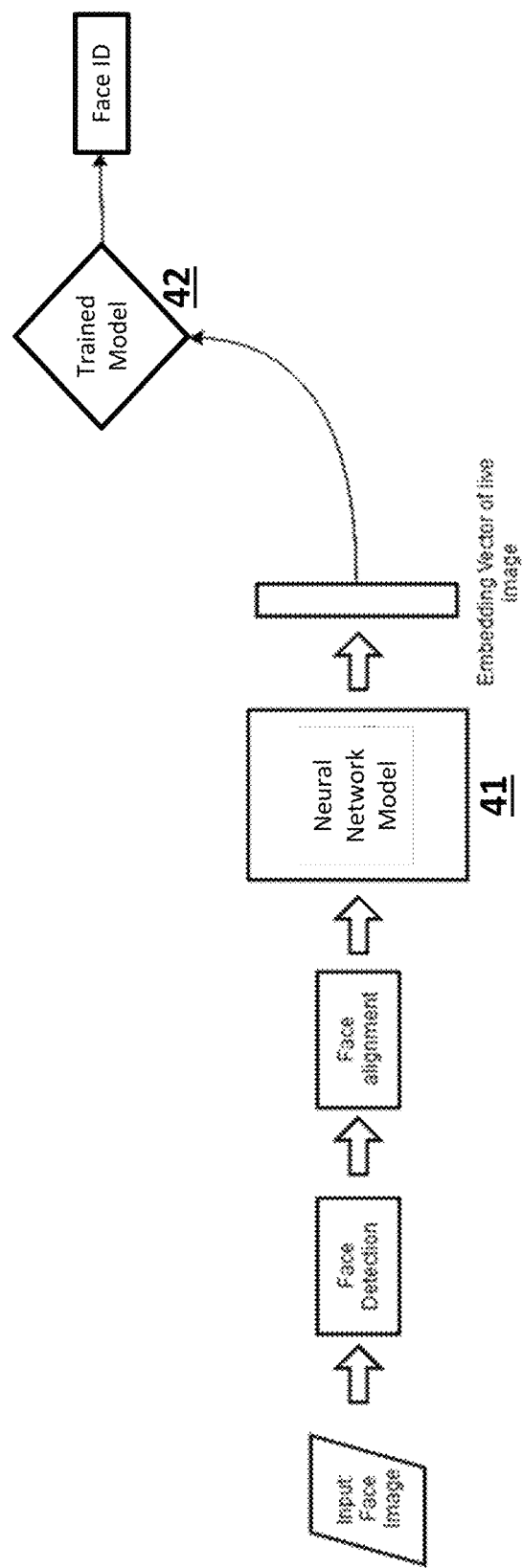
FIG. 2B illustrates a facial recognition classifier system according to an embodiment of the present invention.

The extracted image data and/or machine learning classifier model, as well as the previously-cached image, are then provided to a facial recognition classifier system 40 for verification. FIG. 2B illustrates a facial recognition classifier system according to an embodiment of the present invention. In particular, FIG. 2B depicts an embodiment of the facial recognition classifier system 40 where only an extracted machine learning classifier model and previously-cached live image are required for verification. For example, the facial recognition classifier system 40 can receive the live image as an input and the machine learning classifier model provides a binary output (e.g., yes or no) corresponding to whether or not the live image is similar to the facial images used to train the machine learning classifier model. As depicted in the figure, after the facial recognition classifier system 40 receives the live image, some pre-processing such as facial detection and alignment is performed on the image before it's provided to a deep neural network 41. The deep neural network 41 can then compute a 128-dimensional embedding vector for the live image. The embedding vector of the live image can then be provided to the extracted machine learning classifier model 42 to determine if the user is authenticated to login or not, e.g., Face ID. According to an embodiment, the machine learning classifier model 42 can be a one class SVM classifier. As such, if the live image is similar to the facial images used to train the machine learning classifier model 42, then the machine learning classifier model 42 will output a "+1." On the other hand, if the live image is not similar to the facial images used to train the machine learning classifier model 42, then the machine learning classifier model 42 will output a "−1."

Figure 2C:
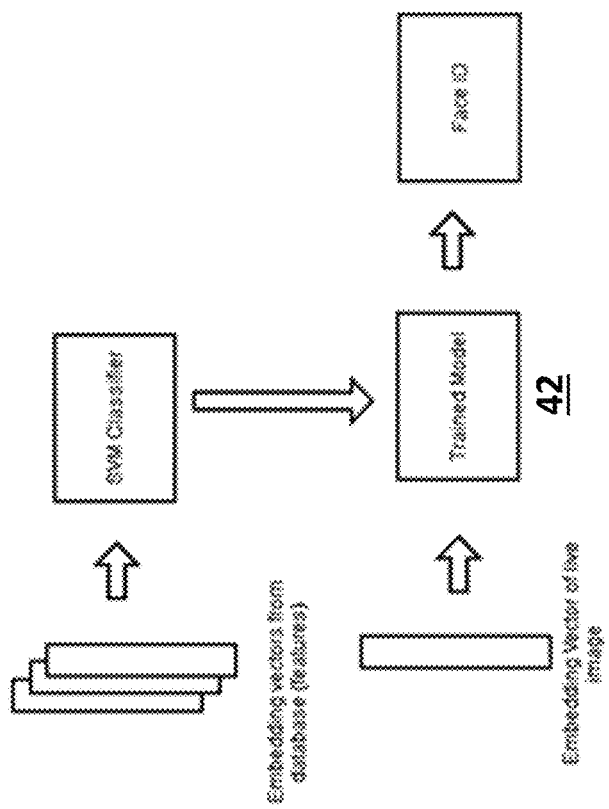
FIG. 2C illustrates another facial recognition classifier system according to an embodiment of the present invention.
Figure 2D:
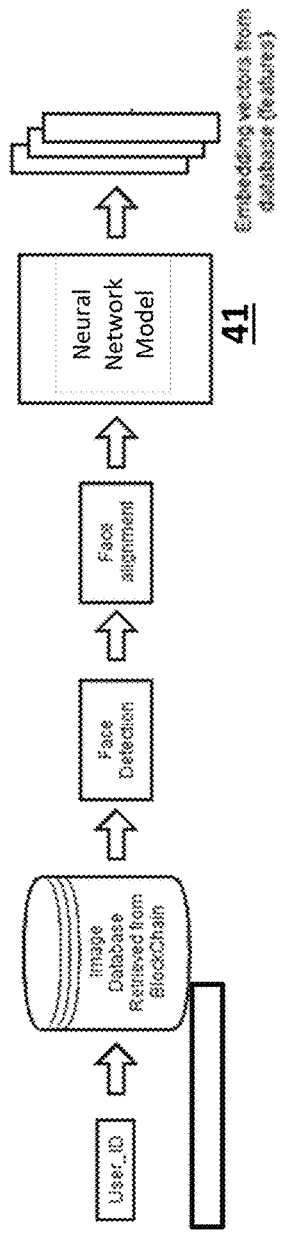
FIG. 2D illustrates an embodiment for generating 128-dimensional vectors of a plurality of facial images for the facial recognition classifier system in FIG. 2C.

FIG. 2C illustrates another facial recognition classifier system according to an embodiment of the present invention. In particular, FIG. 2C depicts an embodiment of the facial recognition classifier system 40 where the previously-stored facial images can be used to re-train the machine learning classifier model 42. For example, as depicted in the figure, the machine learning classifier model 42 can be re-trained with a SVM classifier using 128-dimensional embedding vectors of the previously-stored facial images. According to an embodiment, as depicted in FIG. 2D, 128-dimensional vectors of the previously-stored facial images can be generated as follows, (i) a username (e.g., user_id) is provided to the facial recognition classifier system 40, (ii) the previously-stored facial images are extracted from the blockchain 30 using the username, (iii) some pre-processing such as facial detection and alignment is performed on the extracted images before they're provided to a deep neural network 41, and (iv) the deep neural network generates 128-dimensional embedding vectors of the extracted images. According to an embodiment, the generated 128-dimensional embedding vectors of the extracted images can then be provided to a SVM classifier to re-train the machine learning classifier model 42. As depicted in FIG. 2C, the re-trained machine learning classifier model 42 can then be used to classify a live image e.g., via an 128-dimensional embedding vector of the live image. This scenario can be useful when updating the facial database of the user in order to address the facial variation over time.

Figure 2E:
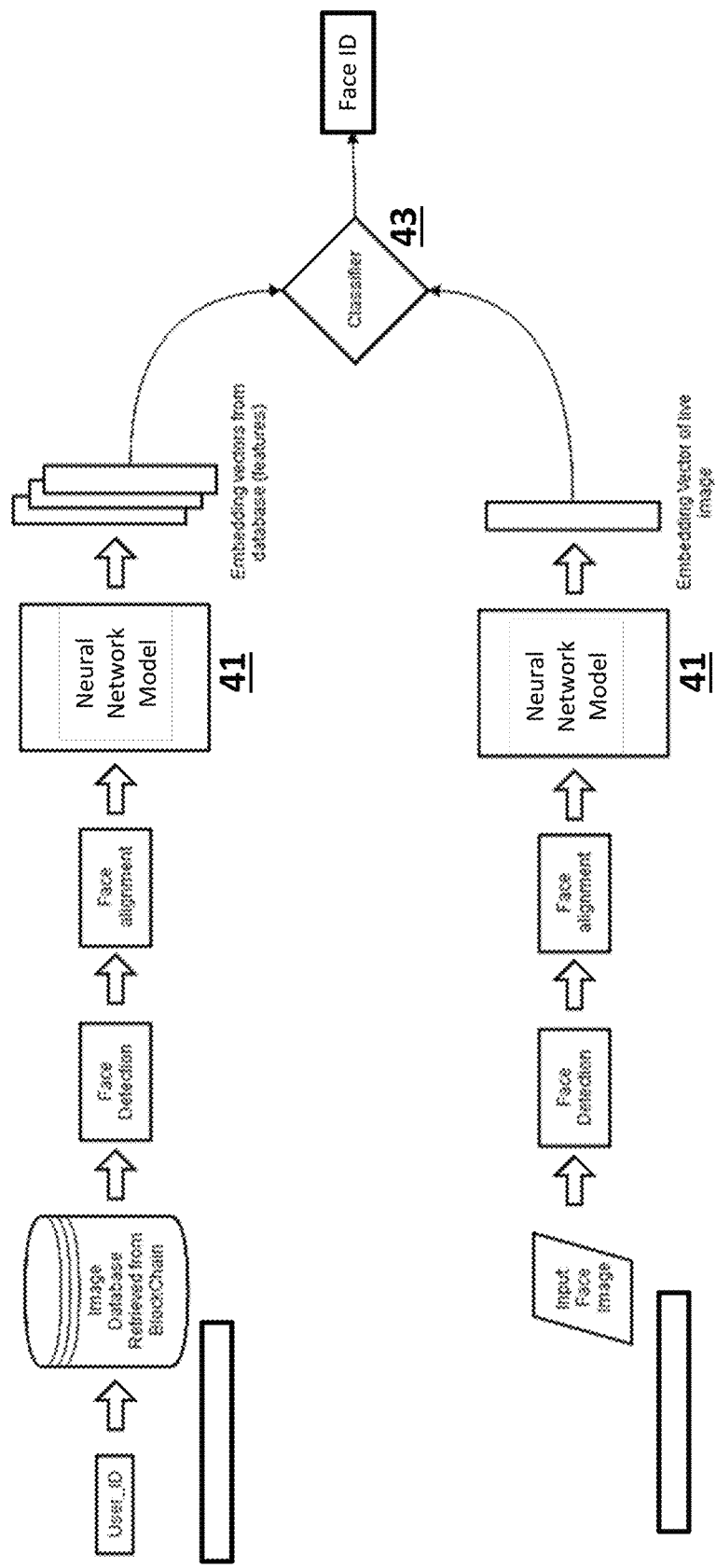
FIG. 2E illustrates another facial recognition classifier system according to an embodiment of the present invention.

FIG. 2E illustrates another facial recognition classifier system according to an embodiment of the present invention. In particular, FIG. 2E depicts an embodiment of the facial recognition classifier system 40 where only the previously-stored facial images are extracted from the blockchain 30 in order to verify the previously-cached live image. Similar to FIG. 2D, the facial recognition classifier system 40 in FIG. 2E also generates 128-dimensional embedding vectors of the extracted images based on a provided username. Further, similar to FIG. 2B, the facial recognition classifier system 40 in FIG. 2E also generates a 128-dimensional embedding vector of the live image. The embedding vectors for the extracted images and the live image can then be provided to a classifier 43 to determine if the user is authenticated to login or not. According to an embodiment, as depicted in FIG. 2F, the classifier 43 can be a distance metric, which can determine the Euclidian distances between corresponding embedding vectors. In this regard, a small distance between two face embedding vectors indicates that the corresponding faces are likely of the same person, while a large distance indicates that the faces are likely not of the same person. If a match is determined in any of FIGS. 2B to 2F, a final validation step is performed at phase 5, where the active directory system 50 is called and checked to determine if the user is permitted to log in, as depicted in FIG. 2A. This involves making an API call to the active directory system to verify that the user's account is still active and they have permissions to log into the system. If the user's account is still active and they have permissions to log into the system, then a Boolean value of "$true" may be returned from the API query. Otherwise, a Boolean value of "$false" is returned, thereby preventing the user from accessing the system.

FIG. 3 illustrates another process flow for authentication and authorization of a registered user according to an embodiment of the present invention. For example, in order to access a particular company system, a user may first input their username into their personal computing device at step 101, which may then be processed by a main program (i.e., processor) 60. Then, in step 102, a device 10 (i.e., camera directly or remotely connected to the computing device) takes a live image of the user currently facing the computing device. This live image may be held in a temporary cache 20 in the computing device to be used for matching later. Then, in step 103, the computing device activates the blockchain API in order to retrieve a blockchain 30 including the user's previously-stored biometric data (e.g., facial images) and/or machine learning classifier model. According to an embodiment, the user's biometric data may be found based on the username provided by the user. In particular, the blockchain 30 determines which of the blockchain blocks includes a username matching the username provided by the user.

After a match is determined, the previously-stored biometric data and/or machine learning classifier model is retrieved and extracted from the user's block as depicted in step 104. Then, in step 105, assuming the machine learning classifier model needs to be retrained, the facial recognition classifier system 40 may be trained with the extracted images from the blockchain block. Otherwise, the method proceeds to step 106. In step 106, the classifier 40 receives the live image stored at the temporary cache 20 and determines, with the extracted machine learning classifier model, whether the live image matches the extracted images. Then, in step 107, an active directory system 50 validates whether the user is authorized to access a system. If so, the user is granted to access to the system as depicted in step 108. Otherwise, the user is denied access to the system.

FIG. 4 illustrates a registration, authentication, and authorization system of a registered user according to an embodiment of the present invention. In particular, the figure depicts an embodiment in which the biometric image data is stored in an IPFS database 70 instead of the blockchain 30. In this regard, the registration, authentication, and authorization processes of FIGS. 1-3, respectively, can be slightly modified. For example, with regard to registration, the biometric image data and/or the machine learning classifier model can be provided to the IPFS database 70 via the blockchain 30. For example, the blockchain 30 may generate an IPFS hash specifying the location of facial images stored in a distributed fashion on the IPFS database 70, and then store the IPFS hash in an associated smart contract 35. According to an embodiment, the smart contract 35 can be a Solidity contract. The smart contract can take an arbitrary number of addresses for storage. The smart contract 35 can also store the trained machine learning classifier model. Further, as depicted in the figure, the machine learning classifier model can be provided from the facial recognition classifier system 40 to the IPFS database 70 via the smart contract 35. As such, the smart contract 35 can include an IPFS hash specifying the location of the machine learning classifier model stored in the IPFS database 70. According to an embodiment, image data can be stored on the IPFS database 70 in the following way: when a user registers, an API client makes a call (with the images) to the smart contract 35 in the blockchain 30, which in turn stores the images on the IPFS database 70. Only the references to these images are stored in the smart contract 35. The retrieval process works the same in the opposite direction, when the relevant block is obtained, the IPFS hashes in the block are used to retrieve the images. In this regard, during authentication and authorization, at least one of the facial images and the machine learning classifier model can be extracted from the IPFS database 70 using the corresponding IPFS hashes. After retrieval, at least one of the machine learning classifier model and/or the plurality of facial images can be provided back to the facial recognition classifier system 40 to validate that an incoming user image matches the facial images stored in the IPFS database 70. For example, similar to FIG. 2B, only the machine learning classifier model can be extracted in order to validate the incoming user image. In this regard, after the facial recognition classifier system 40 receives the incoming user image, some pre-processing such as facial detection and alignment is performed on the image before it's provided to the deep neural network 41. The deep neural network 41 can then compute a 128-dimensional embedding vector for the live image. The embedding vector of the live image can then be provided to the extracted machine learning classifier model 42 to determine if the user is authenticated to login or not. Further, similar to FIGS. 2C and 2D, both of the machine learning classifier model and the plurality of facial images can be extracted in order validate the incoming user image. In this regard, the plurality of facial images are extracted in order to re-train the machine learning classifier model 42 with a SVM classifier using 128-dimensional embedding vectors of the plurality of facial images. Further, similar to FIGS. 2E and 2F, only the plurality of facial images can be extracted in order to validate the incoming user image. In this regard, a Euclidean distance between the embedding vectors of the plurality of facial images and the embedding vector of the incoming user image can be determined in order to validate the incoming user image. According to an embodiment, the embedding vectors for the plurality of facial images and the incoming user image, respectively, can be generated as described above.

According to an embodiment, the system may include one or more computing devices, such as servers, databases, and personal computing devices. Further, the various devices in FIGS. 1 to 4 may be connected by one or more respective networks. The networks may comprise, for example, any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. Personal computing devices such as desktop computers, laptop computers, tablet computers and mobile phones may be used by users and system administrators to access and control the systems.

Those skilled in the art will appreciate that the system diagrams discussed above are merely an example of a blockchain-backed facial recognition system and are not intended to be limiting. Other types and configurations of networks, servers, databases and personal computing devices may be used with exemplary embodiments of the invention. Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Data and information maintained by the servers described above may be stored and cataloged in one or more databases, which may comprise or interface with a searchable database and/or a cloud database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, the system may include a number of servers and personal computing devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A method for secure login to a device, the method comprising:
   receiving, with a processor, a username from a user;
   capturing, with a camera, a live image of the user;
   storing, with the processor, the live image at a memory cache;
   retrieving, with a blockchain application program interface (API), a block in a blockchain corresponding to the username;
   extracting, with the blockchain API, at least one of a machine learning classifier model and a plurality of facial images from the retrieved block;
   determining, with at least one of the machine learning classifier model and the plurality of facial images, whether the live image matches the plurality of facial images, the machine learning classifier including (i) pose estimation of the plurality of facial images, (ii) affine transformation of the plurality of facial images, and (iii) extraction of 128-dimensional embeddings of the transformed plurality of facial images using a deep neural network; and
   selectively providing access to the device based on the determination.

2. The method of claim 1, further comprising:
   upon determining that the live image matches the plurality of facial images, validating, with an active directory system whether the user is authorized to access the system; and
   selectively providing access to the device based on the validation.

3. The method of claim 1, wherein the plurality of facial images are in gray scale.

4. The method of claim 1, further comprising:
   generating a 128-dimensional embedding vector for each of the plurality of facial images; and
   generating another 128-dimensional embedding vector for the live image.

5. The method of claim 4, further comprising:
   determining a Euclidean distance between the 128-dimensional embedding vectors associated with the plurality of facial images and the 128-dimensional embedding vector associated with the live image.

6. The method of claim 1, further comprising:
re-training the machine learning classifier model using the plurality of facial images.

7. The method of claim 1, wherein the machine learning classifier model is trained using one of support vector machines and random forests.

8. A method for secure login to a device, the method comprising:
receiving, with a processor, a username from a user;
capturing, with a camera, a live image of the user;
storing, with the processor, the live image at a memory cache;
retrieving, with a blockchain application program interface (API), a hash stored in smart contract associated with the blockchain API, wherein the hash specifies the location of at least one of a machine learning classifier model and plurality of facial images stored in an interplanetary file system (IPFS) database;
extracting, with the smart contract, at least one of the machine learning classifier model and the plurality of facial images from the IPFS database;
determining, with at least one of the machine learning classifier model and the plurality of facial images, whether the live image matches the plurality of facial images, the machine learning classifier including (i) pose estimation of the plurality of facial images, (ii) affine transformation of the plurality of facial images, and (iii) extraction of 128-dimensional embeddings of the transformed plurality of facial images using a deep neural network; and
selectively providing access to the device based on the determination.

9. The method of claim 8, further comprising:
upon determining that the live image matches the plurality of facial images, validating, with an active directory system whether the user is authorized to access the system; and
selectively providing access to the device based on the validation.

10. The method of claim 8, wherein the plurality of facial images are in gray scale.

11. The method of claim 8, further comprising:
generating a 128-dimensional embedding vector for each of the plurality of facial images; and
generating another 128-dimensional embedding vector for the live image.

12. The method of claim 11, further comprising:
determining a Euclidean distance between the 128-dimensional embedding vectors associated with the plurality of facial images and the 128-dimensional embedding vector associated with the live image.

13. The method of claim 8, further comprising:
re-training the machine learning classifier model using the plurality of facial images.

14. The method of claim 8, wherein the machine learning classifier model is trained using one of support vector machines and random forests.

15. A system for secure login to a device, the system comprising:
a processor;
a camera;
a blockchain; and
a blockchain application program interface (API);
wherein:
the processor is configured to receive a username from a user;
the camera is configured to capture a live image of the user;
the blockchain API is configured to (i) retrieve a block in a blockchain corresponding to the username and (ii) extract at least one of a machine learning classifier model and a plurality of facial images from the retrieved block; and
the processor is further configured to (i) determine, with at least one of the machine learning classifier model and the plurality of facial images, whether the live image matches the plurality of facial images, the machine learning classifier including (i) pose estimation of the plurality of facial images, (ii) affine transformation of the plurality of facial images, and (iii) extraction of 128-dimensional embeddings of the transformed plurality of facial images using a deep neural network, and (ii) selectively provide access to the device based on the determination.

16. The system of claim 15, further comprising:
a memory cache, wherein the memory cache is configured to store the live image captured with the camera.

17. The system of claim 15, further comprising:
an active directory system, wherein upon determining that the live image matches the plurality of facial images, the active directory system is configured to (i) validate whether the user is authorized to access the system and (ii) selectively provide access to the device based on the validation.

18. The system of claim 15, wherein the blockchain is a geth client blockchain.

\* \* \* \* \*